United States Patent
Nielsen

(10) Patent No.: US 9,219,969 B2
(45) Date of Patent: Dec. 22, 2015

(54) METHODS AND SYSTEMS FOR REDUCING SPILLOVER BY ANALYZING SOUND PRESSURE LEVELS

(71) Applicant: Christen V. Nielsen, Palm Harbor, FL (US)

(72) Inventor: Christen V. Nielsen, Palm Harbor, FL (US)

(73) Assignee: The Nielsen Company (US), LLC, New York, NY (US)

(*) Notice: Subject to any disclaimer, the term of this patent is extended or adjusted under 35 U.S.C. 154(b) by 288 days.

(21) Appl. No.: 13/801,176

(22) Filed: Mar. 13, 2013

(65) Prior Publication Data

US 2014/0270195 A1     Sep. 18, 2014

(51) Int. Cl.
*H04R 29/00* (2006.01)
*H04N 21/439* (2011.01)
(Continued)

(52) U.S. Cl.
CPC ............. *H04R 29/00* (2013.01); *H04H 60/31* (2013.01); *H04H 60/37* (2013.01); *H04H 60/45* (2013.01); *H04H 60/58* (2013.01); *H04N 21/4394* (2013.01); *H04N 21/44218* (2013.01); *H04H 2201/30* (2013.01); *H04H 2201/50* (2013.01); *H04H 2201/90* (2013.01)

(58) Field of Classification Search
CPC .............. H04N 21/25886; H04N 21/43615; H04N 21/4131; H04N 21/44218; H04N 21/6582; H04N 21/44222; H04N 21/44213; H04N 21/4126; H04N 21/4394; H04H 60/31; H04H 60/65; H04H 60/58; H04H 60/37; H04H 60/52; H04H 2201/90; H04R 29/00

USPC ........... 725/9, 10, 12, 18, 24; 700/94; 381/56, 381/2, 77; 348/180
See application file for complete search history.

(56) References Cited

U.S. PATENT DOCUMENTS 3,056,135 A   9/1962   Currey et al.
4,107,734 A   8/1978   Percy et al.
(Continued)

FOREIGN PATENT DOCUMENTS

GB   2260246   7/1993
GB   2292506   2/1996
(Continued)

OTHER PUBLICATIONS

Fang et al., "Design of a Wireless Assisted Pedestrian Dead Reckoning System—The NavMote Experience," vol. 54, Issue 6, Institute of Electrical and Electronics Engineers (IEEE), Dec. 2005 (16 pages).
(Continued)

*Primary Examiner* — Vivian Chin
*Assistant Examiner* — David Ton
(74) *Attorney, Agent, or Firm* — Hanley, Flight & Zimmerman, LLC

(57) ABSTRACT

Methods, apparatus, and articles of manufacture for reducing spillover in a media monitoring system are disclosed. An example method includes identifying media associated with media monitoring data. The media monitoring data is received from a first meter associated with a first media presentation device. The example method includes identifying an expected sound pressure level associated with the first meter. The example method includes comparing the expected sound pressure level to an actual sound pressure level collected from the media by the first meter to determine if spillover occurred. The example method includes crediting the media as a media exposure if spillover did not occur.

26 Claims, 7 Drawing Sheets

(51) Int. Cl.
*H04H 60/37* (2008.01)
*H04H 60/45* (2008.01)
*H04H 60/58* (2008.01)
*H04N 21/442* (2011.01)
*H04H 60/31* (2008.01)

(56) References Cited

U.S. PATENT DOCUMENTS

| | | |
|---|---|---|
| 4,382,291 A | 5/1983 | Nakauchi |
| 4,626,904 A | 12/1986 | Lurie |
| 4,644,509 A | 2/1987 | Kiewit et al. |
| 4,695,879 A | 9/1987 | Weinblatt |
| 4,718,106 A | 1/1988 | Weinblatt |
| 4,769,697 A | 9/1988 | Gilley et al. |
| 4,779,198 A | 10/1988 | Lurie |
| 4,930,011 A | 5/1990 | Kiewit |
| 4,955,000 A | 9/1990 | Nastrom |
| 4,972,471 A | 11/1990 | Gross et al. |
| 4,972,503 A | 11/1990 | Zurlinden |
| 4,990,892 A | 2/1991 | Guest et al. |
| 5,119,104 A | 6/1992 | Heller |
| 5,146,231 A | 9/1992 | Ghaem et al. |
| 5,226,090 A | 7/1993 | Kimura |
| 5,226,177 A | 7/1993 | Nickerson |
| 5,285,498 A | 2/1994 | Johnston |
| 5,382,970 A | 1/1995 | Kiefl |
| 5,387,993 A | 2/1995 | Heller et al. |
| 5,404,377 A | 4/1995 | Moses |
| 5,442,343 A | 8/1995 | Cato et al. |
| 5,457,807 A | 10/1995 | Weinblatt |
| 5,473,631 A | 12/1995 | Moses |
| 5,481,294 A | 1/1996 | Thomas et al. |
| 5,483,276 A | 1/1996 | Brooks et al. |
| 5,550,928 A | 8/1996 | Lu et al. |
| 5,574,962 A | 11/1996 | Fardeau et al. |
| 5,579,124 A | 11/1996 | Aijala et al. |
| 5,581,800 A | 12/1996 | Fardeau et al. |
| 5,629,739 A | 5/1997 | Dougherty |
| 5,630,203 A | 5/1997 | Weinblatt |
| 5,640,144 A | 6/1997 | Russo et al. |
| 5,646,675 A | 7/1997 | Copriviza et al. |
| 5,692,215 A | 11/1997 | Kutzik et al. |
| 5,774,876 A | 6/1998 | Woolley et al. |
| 5,787,334 A | 7/1998 | Fardeau et al. |
| 5,793,409 A | 8/1998 | Tetsumura |
| 5,812,930 A | 9/1998 | Zavrel |
| 5,815,114 A | 9/1998 | Speasl et al. |
| 5,872,588 A | 2/1999 | Aras et al. |
| 5,884,278 A | 3/1999 | Powell |
| 5,893,093 A | 4/1999 | Wills |
| 5,982,808 A | 11/1999 | Otto |
| 6,002,918 A | 12/1999 | Heiman et al. |
| 6,035,177 A | 3/2000 | Moses et al. |
| 6,091,956 A | 7/2000 | Hollenberg |
| 6,098,048 A | 8/2000 | Dashefsky et al. |
| 6,243,739 B1 | 6/2001 | Schwartz et al. |
| 6,252,522 B1 | 6/2001 | Hampton et al. |
| 6,359,557 B2 | 3/2002 | Bilder |
| 6,396,413 B2 | 5/2002 | Hines et al. |
| 6,424,264 B1 | 7/2002 | Giraldin et al. |
| 6,430,498 B1 | 8/2002 | Maruyama et al. |
| 6,433,689 B1 | 8/2002 | Hovind et al. |
| 6,467,089 B1 | 10/2002 | Aust et al. |
| 6,470,264 B2 | 10/2002 | Bide |
| 6,493,649 B1 | 12/2002 | Jones et al. |
| 6,497,658 B2 | 12/2002 | Roizen et al. |
| 6,563,423 B2 | 5/2003 | Smith |
| 6,577,238 B1 | 6/2003 | Whitesmith et al. |
| 6,647,548 B1 | 11/2003 | Lu et al. |
| 6,654,800 B1 | 11/2003 | Rieger, III |
| 6,731,942 B1 | 5/2004 | Nageli |
| 6,748,317 B2 | 6/2004 | Maruyama et al. |
| 6,766,524 B1 | 7/2004 | Matheny et al. |
| 6,842,877 B2 | 1/2005 | Robarts et al. |
| 6,882,837 B2 | 4/2005 | Fernandez et al. |
| 6,888,457 B2 | 5/2005 | Wilkinson et al. |
| 6,898,434 B2 | 5/2005 | Pradhan et al. |
| 6,919,803 B2 | 7/2005 | Breed |
| 6,928,280 B1 | 8/2005 | Xanthos et al. |
| 6,934,508 B2 | 8/2005 | Ceresoli et al. |
| 6,940,403 B2 | 9/2005 | Kail, IV |
| 6,958,710 B2 | 10/2005 | Zhang et al. |
| 6,967,674 B1 | 11/2005 | Lausch |
| 6,970,131 B2 | 11/2005 | Percy et al. |
| 7,038,619 B2 | 5/2006 | Percy et al. |
| 7,046,162 B2 | 5/2006 | Dunstan |
| 7,076,441 B2 | 7/2006 | Hind et al. |
| 7,080,061 B2 | 7/2006 | Kabala |
| 7,099,676 B2 | 8/2006 | Law et al. |
| 7,126,454 B2 | 10/2006 | Bulmer |
| 7,148,803 B2 | 12/2006 | Bandy et al. |
| 7,155,159 B1 | 12/2006 | Weinblatt et al. |
| 7,171,331 B2 | 1/2007 | Vock et al. |
| 7,222,071 B2 * | 5/2007 | Neuhauser et al. ........... 704/231 |
| 7,295,108 B2 | 11/2007 | Corrado et al. |
| 7,460,827 B2 | 12/2008 | Schuster et al. |
| 7,463,143 B2 | 12/2008 | Forr et al. |
| 7,471,987 B2 | 12/2008 | Crystal et al. |
| 7,483,975 B2 * | 1/2009 | Kolessar et al. ............. 709/224 |
| 7,739,705 B2 | 6/2010 | Lee et al. |
| 7,793,316 B2 * | 9/2010 | Mears et al. ........................ 725/9 |
| 7,882,514 B2 | 2/2011 | Nielsen et al. |
| 8,526,626 B2 | 9/2013 | Nielsen et al. |
| 8,738,763 B2 | 5/2014 | Crystal et al. |
| 2002/0068556 A1 | 6/2002 | Brown |
| 2002/0097885 A1 | 7/2002 | Birchfield et al. |
| 2002/0144259 A1 | 10/2002 | Gutta et al. |
| 2002/0150387 A1 | 10/2002 | Kunii et al. |
| 2002/0174425 A1 | 11/2002 | Markel et al. |
| 2002/0198762 A1 | 12/2002 | Donato |
| 2003/0033600 A1 | 2/2003 | Cliff et al. |
| 2003/0070182 A1 | 4/2003 | Pierre et al. |
| 2003/0093784 A1 | 5/2003 | Dimitrova et al. |
| 2003/0097302 A1 | 5/2003 | Overhultz et al. |
| 2003/0122708 A1 | 7/2003 | Percy et al. |
| 2003/0126593 A1 | 7/2003 | Mault |
| 2003/0136827 A1 | 7/2003 | Kaneko et al. |
| 2003/0146871 A1 | 8/2003 | Karr et al. |
| 2003/0171833 A1 | 9/2003 | Crystal et al. |
| 2003/0177488 A1 | 9/2003 | Smith et al. |
| 2003/0194004 A1 | 10/2003 | Srinivasan |
| 2003/0208754 A1 | 11/2003 | Sridhar et al. |
| 2003/0222819 A1 | 12/2003 | Karr et al. |
| 2003/0222820 A1 | 12/2003 | Karr et al. |
| 2004/0019675 A1 | 1/2004 | Hebeler, Jr. et al. |
| 2004/0025174 A1 | 2/2004 | Cerrato |
| 2004/0027271 A1 | 2/2004 | Schuster et al. |
| 2004/0122679 A1 | 6/2004 | Neuhauser et al. |
| 2004/0198386 A1 | 10/2004 | Dupray |
| 2004/0266457 A1 | 12/2004 | Dupray |
| 2005/0035857 A1 | 2/2005 | Zhang et al. |
| 2005/0141345 A1 | 6/2005 | Holm et al. |
| 2005/0144632 A1 | 6/2005 | Mears et al. |
| 2005/0172311 A1 | 8/2005 | Hjelt et al. |
| 2005/0200476 A1 | 9/2005 | Forr et al. |
| 2005/0201826 A1 | 9/2005 | Zhang et al. |
| 2005/0203798 A1 | 9/2005 | Jensen et al. |
| 2005/0204379 A1 | 9/2005 | Yamamori |
| 2005/0207592 A1 | 9/2005 | Sporer et al. |
| 2005/0216509 A1 | 9/2005 | Kolessar et al. |
| 2005/0234774 A1 | 10/2005 | Dupree |
| 2005/0243784 A1 | 11/2005 | Fitzgerald et al. |
| 2005/0244011 A1 | 11/2005 | Kim |
| 2005/0264430 A1 | 12/2005 | Zhang et al. |
| 2006/0053110 A1 | 3/2006 | McDonald et al. |
| 2006/0075421 A1 | 4/2006 | Roberts et al. |
| 2006/0168613 A1 | 7/2006 | Wood et al. |
| 2007/0011040 A1 * | 1/2007 | Wright et al. .................... 705/10 |
| 2007/0266395 A1 * | 11/2007 | Lee et al. ........................ 725/11 |
| 2007/0288277 A1 | 12/2007 | Neuhauser et al. |
| 2007/0288476 A1 | 12/2007 | Flanagan, III et al. |
| 2007/0294057 A1 | 12/2007 | Crystal et al. |
| 2007/0294132 A1 | 12/2007 | Zhang et al. |
| 2007/0294705 A1 | 12/2007 | Gopalakrishnan et al. |

(56) References Cited

U.S. PATENT DOCUMENTS

| | | | |
|---|---|---|---|
| 2007/0294706 A1 | 12/2007 | Neuhauser et al. | |
| 2008/0059988 A1* | 3/2008 | Lee et al. | 725/9 |
| 2008/0101454 A1 | 5/2008 | Luff et al. | |
| 2008/0130906 A1 | 6/2008 | Goldstein et al. | |
| 2008/0204273 A1 | 8/2008 | Crystal et al. | |
| 2009/0037575 A1 | 2/2009 | Crystal et al. | |
| 2010/0199296 A1 | 8/2010 | Lee et al. | |
| 2011/0019835 A1 | 1/2011 | Schmidt et al. | |
| 2011/0091055 A1 | 4/2011 | LeBlanc | |
| 2012/0148058 A1 | 6/2012 | Chen | |
| 2012/0148067 A1 | 6/2012 | Petersen et al. | |
| 2012/0169359 A1 | 7/2012 | Kim et al. | |
| 2012/0219156 A1 | 8/2012 | Ramaswamy et al. | |
| 2013/0034244 A1 | 2/2013 | Van Raalte et al. | |
| 2013/0160042 A1 | 6/2013 | Stokes et al. | |
| 2013/0166050 A1 | 6/2013 | Duwenhorst | |
| 2014/0007153 A1 | 1/2014 | Nielsen et al. | |
| 2014/0150001 A1* | 5/2014 | McMillan | 725/9 |
| 2014/0250448 A1 | 9/2014 | Nielsen | |
| 2014/0282640 A1 | 9/2014 | Nielsen | |
| 2014/0282663 A1 | 9/2014 | Lee | |

FOREIGN PATENT DOCUMENTS

| | | |
|---|---|---|
| JP | 2000307530 | 11/2000 |
| JP | 20003279400 | 10/2003 |
| JP | 2010257278 | 11/2010 |
| JP | 2012507904 | 3/2012 |
| JP | 2012095014 | 5/2012 |
| JP | 2012242214 | 12/2012 |
| KR | 1020100048330 | 5/2010 |
| KR | 1020120067477 | 6/2012 |
| KR | 1020120131826 | 12/2012 |
| WO | 8810540 | 12/1988 |
| WO | 9111062 | 7/1991 |
| WO | 9411989 | 5/1994 |
| WO | 9731440 | 8/1997 |
| WO | 9955057 | 10/1999 |
| WO | 0131816 | 5/2001 |
| WO | 03087871 | 10/2003 |
| WO | 2004051303 | 6/2004 |
| WO | 2004051304 | 6/2004 |
| WO | 2006037014 | 4/2006 |
| WO | 2006096177 | 9/2006 |

OTHER PUBLICATIONS

Bernstein et al., "An Introduction to Map Matching for Personal Navigation Assistants," New Jersey TIDE Center, New Jersey Institute of Technology, Aug. 1996 (17 pages).
Kerschbaumer, Ken, "Who's Really Watching?" PricewaterhouseCoopers Global Entertainment and Medai Outlook 2004-2008, May 16, 2005 (4 pages).
McCarthy et al., "RF Free Ultrasonic Positioning," Department of Computer Science, University of Bristol, U.K., 2003 (7 pages).
McCarthy et al., "RF Free Ultrasonic Positioning (Presentation)," 7th International Symposiom on Wearable Computers, Oct. 2003 (12 pages).
Gentile et al., "Robust Location using System Dynamics and Motion Constraints," National Institute of Standards and Technology, Wireless Communication Technologies Group, Jun. 24, 2004 (5 pages).
Cricket Project, "Cricket v2 User Manual," MIT Computer Science and Artificial Intelligence Lab, Cambridge, U.S.A., Jan. 2005 (57 pages).
Holm, Sverre, "Technology Presentation," [online]. Sonitor Technologies, May 26, 2004 [retrieved on Oct. 13, 2004]. Retrieved from the Internet: <URL: www.sonitor.com/news/article.asp?id=62> (16 pages).
"The Nibble Location System," [online]. UCLA, May 21, 2001 [retrieved on Nov. 2, 2004]. Retrieved from the Internet: <URL: http://mmsl.cs.ucla.edu/nibble/>. (13 pages).
"New Sonitor Patent Combines Ultrasound and RFID," [online]. Sonitor Technologies, Feb. 17, 2005 [retrieved on Jun. 13, 2005]. Retrieved from the Internet: <URL: http://sonitor.com/news/article.asp?id=73>. (1 page).

"NIST Location System," [online]. Wireless Communication Technologies Group, National Institute of Standards and Technology, Mar. 12, 2004 [retrieved in Nov. 1, 2004]. Retrieved from the Internet: <URL: www.antd.nist.gov>. (2 pages).
Ferguson, Michael, "XTension Tech Notes," [online]. Sand Hill Engineering Inc., Dec. 10, 1998 [retrieved in Jan. 12, 2004]. Retrieved from the Internet: <URL: http://www.shed.com/articles/TN.proximity.html >. (9 pages).
"FM Wireless Microphone Module Kits," [online]. Horizon Industries, 2004 [retrieved on Sep. 30, 2004]. Retrieved from the Internet: <URL: www.horizonindustries.com/fm.htm>. (1 page).
"Arkon Sound Feeder II FM Transmitter," [online].Yahoo Shopping, 2002 [retrieved on Sep. 29, 2004]. Retrieved from the Internet: <URL: http://store.yahoo.com/semsons-inc/arsoundfeedii.html>. (2 pages).
"Dust Networks—SmartMesh," [online]. Dust Networks Inc., 2002 [retrieved on Sep. 29, 2004]. Retrieved from the Internet: <URL: www.dustnetworks.com>. (2 pages).
Kanellos, Michael, "Dust Makes Mesh of Wireless Sensors," [online]. CNET News.com, Sep. 20, 2004 [retrieved on Sep. 29, 2004]. Retrieved from the Internet: <URL: http://www.news.com/Dust-makes-mesh-of-wireless-sensors/2100-1008_3-5374971.html?tag=item>. (2 pages).
"UHF Radio Data Logging System—Genll Data Logger," [online]. Amplicon, 2004 [retrieved on Sep. 29, 2004]. Retrieved from the Internet: <URL: www.amplicon.co.uk/dr-prod3.cfm/subsecid/10037/secid/1/groupid/11809.htm>. (3 pages).
"Eltek Genll Radio Data Logging System," [online]. Eltek Ltd., 2004 [retrieved on Sep. 29, 2004]. Retrieved from the Internet: <URL: www.elteckdataloggers.co.uk>. (4 pages).
"World's Smallest Hands Free Radio," [online]. Yahoo Shopping, 2004 [retrieved on Sep. 29, 2004]. Retrieved from the Internet: <URL: http://store.yahoo.com/latesttrends/worsmalhanfr.html>. (1 page).
"American Technology Corporation—Retailer Ads—AM & FM Sounds," [online]. Woody Norris, May 4, 2004 [retrieved on Sep. 29, 2004]. Retrieved from the Internet: <URL: www.woodynorris.com>. (3 pages).
"X1 Button Radio—The World's Smallest Radio," [online]. Exxun, 2004 [retrieved on Sep. 29, 2004]. Retrieved from the Internet: <URL: www.exxun.com>. (2 pages).
"Discovery Spy Motion Tracking System," [online]. Discovery Communications Inc., 2004 [retrieved on Sep. 14, 2004]. Retrieved from the Internet: <URL: http://shopping.discovery.com/stores/servlet/ProductDisplay?catalogId=10000&storeId=10000&lanlan=-1&productId=53867&partnumber=689638>. (3 pages).
Schuman, Evan. "Smarter Smart Cart?" [online]. Storefront Backtalk, Feb. 16, 2005 [retrieved on Nov. 20, 2006]. Retrieved from the Internet: <URL: www.storefrontbacktalk.com>. (5 pages).
"Arbitron & Scarborough Unveil New Mall Shopper Audience Measurement," [online]. Streamline Media Inc., Jun. 22, 2007 [retrieved in 2007]. Retrieved from the Internet: <URL: www.radioink.com>. (2 pages).
"University Library Navigation Enabled by Ekahau," [online]. Directions Magazine, Jun. 12, 2003 [Aug. 3, 2007]. Retrieved from the Internet: <URL: http://www/directionsmag.com/press.releases/index.php?duty=Show&id=7276&trv=1>. (3 pages).
Patent Cooperation Treaty, "Search Report," issued on Oct. 31, 2006 in corresponding PCT application No. PCT/US05/34743 (4 pages).
Patent Cooperation Treaty, "Search Opinion" issued on Oct. 31, 2006 in corresponding PCT application No. PCT/US05/34743 (9 pages).
Yeung, K.L., & Yum, T.-S.P. "A Comparative Study on Location Tracking Strategies in Cellular Mobile Radio Systems," Global Telecommunications Conference, 1995. Globecom '95, IEEE, Nov. 14-26, 1995 (pp. 22-28 vol. 1).
Handy et al., "Lessons Learned from Developing a Bluetooth Multiplayer-Game," 2nd International Conference on Pervasive Computing, Workshop on Gaming, [retrieved from internet, http://www.ipsi.fraunhofer.de/ambiente/pervasivegaming/papers/Handy_Pervasive2004.pdf] (7 pages).
Battiti, Roberto, et al. "Location-Aware Computing: a Neutral Network Model for Determining Location in Wireless LANS" Univer-

(56) References Cited

OTHER PUBLICATIONS sity of Trento: Department of Information and Communication Technology, Technical Report #DIT-02-0083, Feb. 2002 (pp. 1-16).

Azondekon et al., "Service Selection in Networks Based on Proximity Confirmation Using Infrared", http://www.scs.carleton.ca/~barbeau/Publications/2002/azondekon.pdf, International Conference on Telecommunications (ICT) Beijing, 2002 (5 Pages).

Bahl et al., "A Software System for Locating Mobile Users: Design, Evaluation, and Lessons," Technical Report MSR-TR-2000-12 Microsoft Research, [retrieved from internet, http://research.microsoft.com/~bahl/Papers/Pdf/radar.pdf] Feb. 2000 (13 pages).

Wagner, David P. Batelle. Report: Lexington Area Travel Data Collection Test; GPS for Personal Travel Surveys. Final Report for Office of Highway Information Management, Office of Technology Application and Federal Highway Administration, Sep. 1997 (92 pages).

United States Patent and Trademark Office, "Notice of Allowance," issued in connection with U.S. Appl. No. 11/692,087, on Jan. 12, 2010 (8 pages).

United States Patent and Trademark Office, "Interview Summary," issued in connection with U.S. Appl. No. 11/692,087, on Dec. 11, 2009 (3 pages).

United States Patent and Trademark Office, "Final Rejection," issued in connection with U.S. Appl. No. 11/692,087, on Oct. 30, 2009 (15 pages).

United States Patent and Trademark Office, "Non-Final Office Action," issued in connection with U.S. Appl. No. 11/692,087, on May 13, 2009 (11 pages).

Patent Cooperation Treaty, "Written Opinion," issued in connection with International Application No. PCT/US2014/021986, Jun. 27, 2014 (4 Pages).

Patent Cooperation Treaty, "International Search Report," issued in connection with International Application No. PCT/US2014/021986, Jun. 27, 2014 (3 Pages).

Australian Government, IP Australia, "Patent Examination Report No. 1," issued in connection with Australian Patent Application No. 2013205025 on Aug. 11, 2014 (5 pages).

\* cited by examiner

US 9,219,969 B2

METHODS AND SYSTEMS FOR REDUCING SPILLOVER BY ANALYZING SOUND PRESSURE LEVELS

FIELD OF THE DISCLOSURE

The present disclosure relates generally to media monitoring and, more particularly, to methods and systems for reducing spillover by analyzing sound pressure levels.

BACKGROUND

Audience measurement of media, such as television, music, movies, radio, Internet websites, streaming media, etc., is typically carried out by monitoring media exposure of panelists that are statistically selected to represent particular demographic groups. Using various statistical methods, the captured media exposure data is processed to determine the size and demographic composition of the audience(s) for programs of interest. The audience size and demographic information is valuable to advertisers, broadcasters and/or other entities. For example, audience size and demographic information is a factor in the placement of advertisements, as well as a factor in valuing commercial time slots during a particular program.

DETAILED DESCRIPTION

Figure 1:
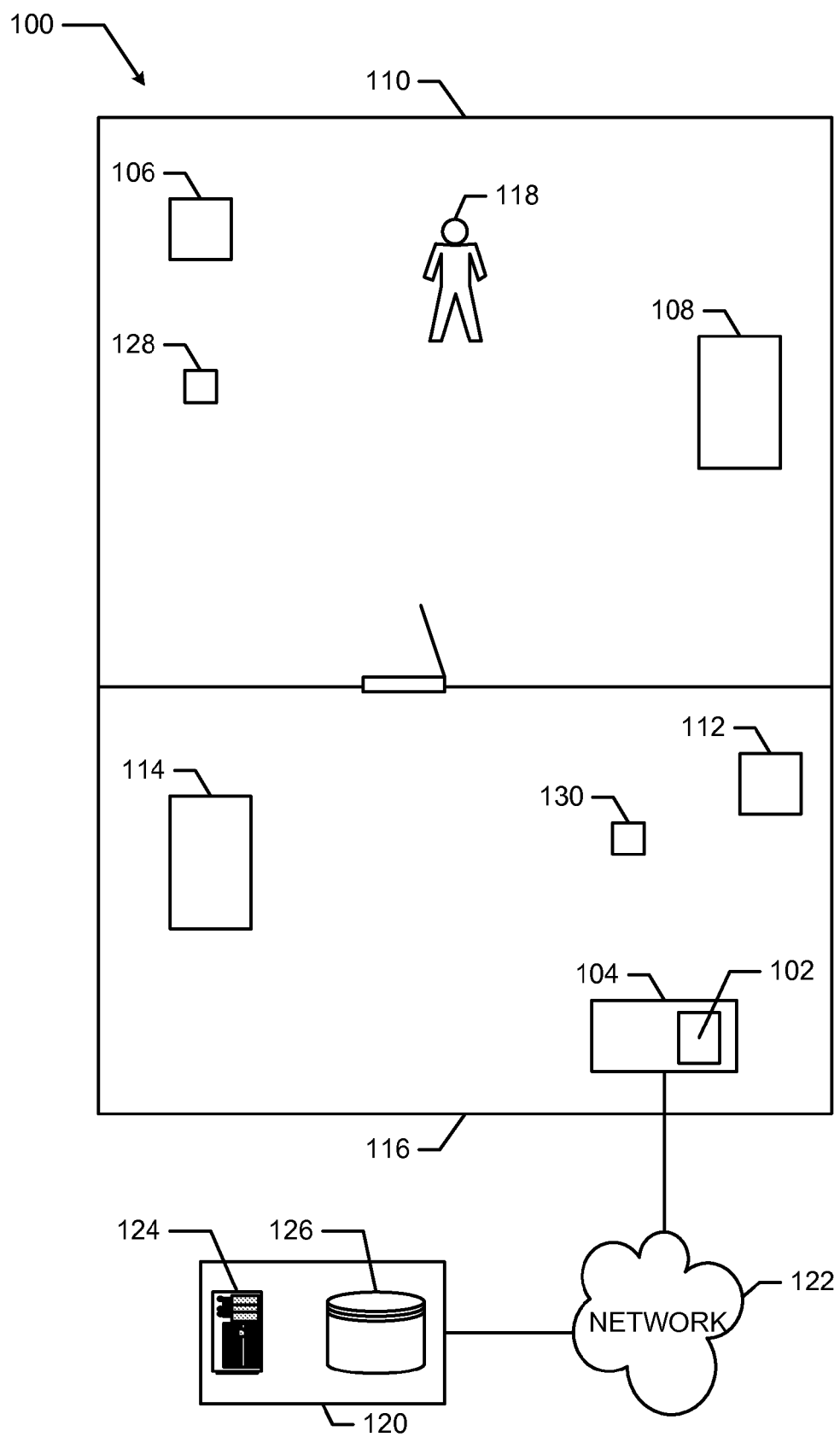
FIG. 1 illustrates an example system including an example spillover manager implemented in accordance with the teachings of this disclosure to manage spillover to reduce media monitoring inaccuracies in the system.

Audience measurement companies enlist persons to participate in measurement panels. Such persons (e.g., panelists) agree to allow the audience measurement company to measure their exposure to media (e.g., television programming, radio programming, Internet, advertising, signage, outdoor advertising, etc.). In order to associate media monitoring data (i.e., data reflecting media presentation) with panelist demographics, the audience measurement company monitors media device(s) and/or panelist(s) using meters.

In some examples, meters (e.g., stationary meters) are placed with and/or near media presentation devices (e.g., televisions, stereos, speakers, computers, etc.) within a home or household. For example, a meter may be placed in a room with a television and another meter may be placed in a different room with another television. In some examples, personal portable metering devices (PPMs), which are also known as portable metering devices or portable personal (or people) meters, are used to monitor media exposure of panelists. A PPM is an electronic device that is typically worn (e.g., clipped to a belt or other apparel) or carried by a panelist. The term "meter" as used herein refers generally to stationary meters and/or portable meters.

In general, media identifying meters are configured to use a variety of techniques to monitor media presentations at media presentation devices and/or exposure of panelists to media presentations. For example, one technique for monitoring media exposure involves detecting or collecting media identifying information (e.g., codes (e.g., watermarks), signatures, etc.) from media signals (e.g., audio and/or video signals) that are emitted or presented by media presentation devices.

As media (e.g., content and/or advertisements) is presented, a media identifying meter may receive media signals (e.g., via a microphone) associated with the media and may detect media (e.g., audio and/or video) information associated with the media to generate media monitoring data. In general, media monitoring data may include any information that is representative of (or associated with) media and/or that may be used to identify a particular media presentation (e.g., a song, a television program, a movie, a video game, an advertisement, etc.). For example, the media monitoring data may include signatures that are collected or generated by the media identifying meter based on the media, audio codes that are broadcast simultaneously with (e.g., embedded in) the media, etc. Each media identifying meter may receive different media signals based on the media presented (e.g., tuned) on the media presentation devices to which panelists are exposed.

Media monitoring systems may also include one or more people meters to identify panelists in a monitored audience. Identifying the panelists in the audience allows mapping of their demographics to the media. Panelists provide their demographic information when they agree to be monitored by the audience measurement system. Any method of people metering may be employed. For example, the people metering may be active in that it requires panelists to self-identify by, for instance, entering an identifier corresponding to their name, or it may be passive in that electronics (e.g., video cameras) may be used to identify and/or count persons in the audience. See U.S. Pat. No. 7,609,853, which is hereby incorporated by reference herein in its entirety for an example people metering solution.

A panelist home may present unique monitoring challenges to the media identifying meters. For example, a panelist home often includes multiple media presentation devices, each configured to present media to specific viewing and/or listening areas located within the home. Known media identifying meters that are located in one of the viewing and/or listening areas are typically configured to detect any media being presented in the viewing and/or listening area and to credit the media as having been presented. Thus, known media identifying meters operate on the premise that any media detected by the media identifying meter is media that was presented in that particular viewing and/or listening area. However, in some cases, a media identifying meter may detect media that is emitted by a media presentation device that is not located within the viewing or listening proximity of a panelist in the room with the media identifying meter thereby causing the detected media to be improperly credited to the panelist currently associated with the monitored area (via, for example, a people meter). The ability of the media identifying meter to detect media being presented outside of the viewing and/or listening proximity of the panelist is referred to as "spillover" because the media being presented outside of the viewing and/or listening proximity of the panelist is "spilling over" into the area occupied by the media identifying meter and may not actually fall within the attention of the panelist. Spillover may occur, for example, when a television in a particular room is powered off, but a media identifying meter associated with that television detects media being presented on a media presentation device in a different room of the panelist home or of an adjacent home (e.g., a neighbor's condominium or apartment). In such an example, the media identifying meter improperly credits the media as being presented on the media presentation device it monitors even though no such presentation occurred.

Another effect, referred to as "hijacking," occurs when a media identifying meter detects different media being presented at multiple media presentation devices at the same time. For example, a media identifying meter in a kitchen may detect a particular media program being presented on a media presentation device in the kitchen, but the media identifying meter may also detect a different media program that is being presented on a different media presentation device in a living room. In such an example, the media presented by the media presentation device in the living room may, in some cases, have signals that overpower or "hijack" the signals associated with the media being presented by the media presentation device in the kitchen. As a result, the media identifying meter in the kitchen may inaccurately credit the media being presented in the living room and fail to credit the media being presented in the kitchen. In some examples, other difficulties such as varying volume levels, varying audio/video content type (e.g., sparse, medium, rich, etc.), varying household transmission characteristics due to open/closed doors, movement and/or placement of furniture, acoustic characteristics of room layouts, wall construction, floor coverings, ceiling heights, etc. may exacerbate these issues and, thus, lead to inaccurate media presentation detection by media identifying meters.

Example methods and systems disclosed herein may be used to manage audio spillover and/or other sources of media monitoring inaccuracies in the course of presentations of media to more accurately assess the exposure of panelists to that media. Example methods and systems may be used to prevent audio spillover from adversely affecting results of media monitoring. Some example methods and systems analyze media monitoring data to determine if audio spillover has occurred. In some such examples, if audio spillover has not occurred, the media is credited as actual media exposure (e.g., a panelist has been exposed to the media). If audio spillover has occurred, the media is not credited as an actual media exposure.

Example methods and systems disclosed herein detect signal spillover by analyzing sound pressure levels associated with media presentations (e.g., sound pressure levels of audio signal waveforms representative of media presentations). Sound pressure levels identify at what volume media presentations (e.g., content and/or advertisements) are being presented (e.g., how loud the media presentation is). Particular sound pressure levels may be expected from media presentations based on where the media presentations are occurring and/or when the media presentations are occurring. For example, quieter media presentations (e.g., with lower sound pressure levels) may be expected later at night and/or when the media presentation is presented in a bedroom and louder media presentations (e.g., with higher sound pressure levels) may be expected during the day and/or when the media presentation is presented in a living room. A value of a sound pressure level expected from a media presentation based on or dependent on a location of presentation and/or a time of presentation is referred to herein as an expected sound pressure level.

In some examples, a media identifying meter monitoring a media presentation from a proximate media presentation device (e.g., a device in the same room as the meter) may analyze a waveform of the media presentation and calculate an actual sound pressure level of the waveform. In some examples, the actual sound pressure level is compared to the expected sound pressure level to determine if spillover has occurred. For example, the actual sound pressure level may be different from (e.g., smaller than) the expected sound pressure level when the audio has traveled a larger distance than expected between the media identifying meter and the media presentation device it monitors, the audio has been transmitted through different rooms (e.g., the signal has bounced off of walls, traveled through a wall, a ceiling, or a floor, etc.), etc. If the actual sound pressure level is sufficiently similar to the expected sound pressure level (e.g., within a threshold amount), it is determined that spillover has not occurred. If the actual sound pressure level is not sufficiently similar to the expected sound pressure level (e.g., within a threshold amount), it is determined that spillover has occurred. In some examples, when it is determined that spillover has occurred, the media presentation is not credited as an actual media exposure.

An example method disclosed herein includes identifying media based on media monitoring data. The media monitoring data is received from a first media identifying meter associated with a first media presentation device. The example method includes identifying an expected sound pressure level associated with the first meter. The example method includes comparing the expected sound pressure level to an actual sound pressure level collected from the media by the first meter to determine if spillover occurred. The example method includes crediting the media as a media exposure if spillover did not occur.

An example spillover manager disclosed herein includes a sound pressure level comparator to identify an expected sound pressure level for media associated with media monitoring data received from a meter associated with a media presentation device. The example sound pressure level comparator is to compare the expected sound pressure level to an actual sound pressure level to determine if spillover occurred. The actual sound pressure level is based on a sample of the media collected by the meter. The example spillover manager includes a media creditor to credit the media with an exposure if spillover did not occur and to not credit the media with an exposure if spillover did occur.

An example tangible computer readable storage medium disclosed herein comprises instructions that, when executed, cause a computing device to identify media associated with media monitoring data. The media monitoring data is received from a first meter associated with a first media presentation device. The example instructions cause the computing device to identify an expected sound pressure level associated with the first meter. The example instructions cause the computing device to compare the expected sound pressure level to an actual sound pressure level collected from the media by the first meter to determine if spillover occurred. The example instructions cause the computing device to credit the media as a media exposure if spillover did not occur.

FIG. 1 illustrates an example media monitoring system 100 in an example environment of use. The example of FIG. 1 includes an example spillover manager 102 implemented in accordance with the teachings of this disclosure to manage spillover to reduce (e.g., prevent) media monitoring inaccuracies in the media monitoring system 100. In the illustrated example, a first media identifying meter 106 monitors media presented by a first media presentation device 108 in a first room 110 and a second media identifying meter 112 monitors media presented on a second media presentation device 114 in a second room 116. Either or both of the first and second media presentation devices 108, 114 may be, for example, a television, a radio, a computer, a stereo system, a DVD player, a game console, etc. Media may include, for example, any form of content, television programming, radio programming, movies, songs, any form of advertisements, Internet information such as websites and/or streaming media, and/or any other video information, audio information, still image information, and/or computer information to which a panelist (e.g., an example panelist 118) may be exposed. While two rooms 110, 116, two media presentation devices 108, 114, and two media identifying meters 106, 112 are shown in the example of FIG. 1, any number and/or type(s) of rooms, any number and/or type(s) of media presentation devices, and/or any number and/or type(s) of meters (including, for example, people meters) in any configuration and/or spatial relationship may be implemented in the example system 100.

In the illustrated example, to respectively monitor media presented on the first and second media presentation devices 108, 114, the first and second media identifying meters 106, 112 process media signals (or portions thereof such as audio portions of the media signals) respectively output by the first and second media presentation devices 108, 114 to extract codes and/or metadata, and/or to generate signatures for use in identifying the media and/or a station (e.g., a broadcaster) originating the media. The first media identifying meter 106 of the illustrated example is intended to monitor the first media presentation device 108 and to not monitor the second media presentation device 114. The second media identifying meter 112 is intended to monitor the second media presentation device 114 and to not monitor the first media presentation device 108.

Identification codes, such as watermarks, ancillary codes, etc. may be embedded within or otherwise transmitted with media signals. Identification codes are data that are inserted into media (e.g., audio or video) to uniquely identify broadcasters and/or media (e.g., content or advertisements), and/or are carried with the media for another purpose such as tuning (e.g., packet identifier headers ("PIDs") used for digital broadcasting). Codes are typically extracted using a decoding operation.

Signatures are a representation of one or more characteristic(s) of the media signal (e.g., a characteristic of the frequency spectrum of the signal). Signatures can be thought of as fingerprints. They are typically not dependent upon insertion of identification codes in the media, but instead preferably reflect an inherent characteristic of the media and/or the media signal. Systems to utilize codes and/or signatures for audience measurement are long known. See, for example, Thomas, U.S. Pat. No. 5,481,294, which is hereby incorporated by reference in its entirety. Codes, metadata, signatures, channel identifiers (e.g., tuned channel numbers), etc. collected and/or generated by the first or second media identifying meters 106, 112 for use in identifying media and/or a station transmitting media may be referred to generally as "media monitoring data."

In the illustrated example, media monitoring data collected by the first media identifying meter 106 and/or the second media identifying meter 112 is transferred to the home processing system 104 for further processing. The first and second media identifying meters 106, 112 may be communicatively coupled with the home processing system 104 via wireless and/or hardwired communications and may periodically and/or aperiodically communicate collected media monitoring information to the home processing system 104. People meters 128, 130 may likewise be communicatively coupled with the home processing system 104 to periodically and/or aperiodically forward people identification data to the home processing system 104.

In the illustrated example, the home processing system 104 is communicatively coupled to a remotely located central data collection facility 120 via a network 122. The example home processing system 104 of FIG. 1 transfers collected media monitoring data to the central facility 120 for further processing. The central facility 120 of the illustrated example collects and/or stores, for example, media monitoring data that is collected by multiple media monitoring devices such as, for example, the media identifying meters 106, 112, and/or demographic information that is collected by people meters, located at multiple panelist locations. The central facility 120 may be, for example, a facility associated with an audience measurement entity such as The Nielsen Company (US), LLC or any affiliate of The Nielsen Company (US), LLC. The central facility 120 of the illustrated example includes a server 124 and a database 126 that may be implemented using any suitable processor, memory and/or data storage apparatus such as that shown in FIG. 7. In some examples, the home processing system 104 is located in the central facility 120.

The network 122 of the illustrated example is used to communicate information and/or data between the example home processing system 104 and the central facility 120. The network 122 may be implemented using any type(s) of public and/or private network(s) such as, but not limited to, the Internet, a telephone network, a cellular network, a local area network ("LAN"), a cable network, and/or a wireless network. To enable communication via the network 122, the home processing system 104 of the illustrated example includes a communication interface that enables connection to an Ethernet, a digital subscriber line ("DSL"), a telephone line, a coaxial cable, and/or any wireless connection, etc.

Some known methods for measuring media exposure or presentation track or log media presentations to which a panelist is exposed and award a media exposure credit to a media presentation whenever the panelist is in the vicinity of that media presentation. However, some such methods may produce inconsistent or inaccurate monitoring results due to spillover that occurs. For example, within the example environment illustrated in FIG. 1, spillover may occur when the first media presentation device 108 is powered off (e.g., is not presenting media), but the first media identifying meter 106 associated with the first media presentation device 108 detects media being presented by the second media presentation device 114. In such an example, the first media identifying meter 106 will incorrectly credit the media presented at the second media presentation device 114 as being presented to the panelist 118. Recording media data that has spilled over from another space (e.g., the room 116) may result in an inaccurate representation of the media presented to the panelist 118. In some such examples, the panelist 118 may not even know or be aware of the media, but the electronics of the media identifying meter 106 may still be sensitive enough to detect a code in the media presented by the second media presentation device 114.

The spillover manager 102 of the illustrated example is used to manage spillover to reduce (e.g., prevent) media monitoring inaccuracies in the example system 100 of FIG. 1.

The example spillover manager 102 of FIG. 1 receives media monitoring data from the first example media identifying meter 106 and/or the second example media identifying meter 112 and analyzes the media monitoring data to determine if spillover has occurred. In the illustrated example, if the example spillover manager 102 detects spillover associated with the first media identifying meter 106 and/or the second media identifying meter 112, the media identified in the media monitoring data is not credited as actual media exposure for the meter/monitored media presentation device that experienced the spillover and the media monitoring data associated with the uncredited media is discarded and/or marked as invalid. In the illustrated example, if the example spillover manager 102 does not detect spillover associated with the first media identifying meter 106 and/or the second media identifying meter 112, the media identified in the media monitoring data is credited as actual media exposure(s). In the illustrated example, the spillover manager 102 sends media monitoring data associated with credited media to the example central facility 120. In some examples, the spillover manager 102 labels portion(s) of the media monitoring data as either associated with credited or uncredited media and sends the identified media monitoring data to the example central facility 120.

In the illustrated example, the spillover manager 102 detects spillover by analyzing sound pressure levels associated with media presentations. Sound pressure levels identify the volume at which media presentations (e.g., content and/or advertisements) are being presented (e.g., how loud the media presentation is). Particular sound pressure levels may be expected from media presentations based on where the media presentations are occurring and/or when the media presentations are occurring. A sound pressure level expected from a media presentation based on a location of presentation and/or a time of presentation may be referred to as an expected sound pressure level. The spillover manager 102 of the illustrated example stores and/or accesses (e.g., from the central facility 120) expected sound pressure levels for use in spillover detection. In some examples, for each media identifying meter in a home (e.g., the first and second media identifying meters 106, 112), one or more expected sound pressure levels are stored based on days and/or times of media presentations being monitored by the meters. Expected sound pressure levels may be calculated and/or determined during, for example, a training period where values of sound pressure levels for particular meters and/or areas of homes at particular days and/or times are gathered and analyzed for use in spillover detection.

In the illustrated example, the first and second media identifying meters 106, 112 receive media signals (e.g., audio) associated with media presentations (e.g., via microphones). In the illustrated example, in addition to collecting media monitoring data from the received media signals, the example first and second media identifying meters 106, 112 analyze samples of the media (e.g., audio waveforms of the media signals) and calculate sound pressure levels of the audio waveforms. The sound pressure levels calculated by the example first and second media identifying meters 106, 112 are referred to as "actual sound pressure levels" because they represent the sound pressure levels of the audio waveforms after they have been presented on the first or second media presentation devices 108, 114 and received at the corresponding first and/or second media identifying meters 106, 112. The first and second media identifying meters 106, 112 of the illustrated example timestamp the media monitoring data and the actual sound pressure levels and store the timestamped data in association with a meter identifier of the first or second media identifying meters 106, 112. The meter identifier identifies the particular media identifying meter (e.g., the media identifying meter 106 or the media identifying meter 112) collecting the media monitoring data. This meter identifier is important in the spillover determination and in aligning people identifying data collected by the people meters 128, 130 with the media identifying information collected by the media identifying meters 106, 112. The meter identifier may be an alphanumeric identification code (e.g., a series of letters and/or numbers) that may be used to identify the media identifying meter 106 or the media identifying meter 112. The first and second media identifying meters 106, 112 send the timestamped media monitoring data and actual sound pressure level data with the meter identifier to the example spillover manager 102 for analysis. In some examples, the sound pressure levels are not generated at the media identifying meters 106, 112, but instead are generated at the spillover manager 102.

The spillover manager 102 of the illustrated example identifies expected sound pressure levels to be compared with the actual sound pressure levels received from the first and second media identifying meters 106, 112. To identify expected sound pressure levels, the spillover manager 102 of the illustrated example uses the meter identifier and/or the timestamp associated with the actual sound pressure level data (e.g., the spillover manager 102 uses the meter identifier and/or the timestamp to access a table storing the expected sound pressure levels). An example table is illustrated below.

TABLE 1

| METER IDENTIFIER | TIME | EXPECTED SOUND PRESSURE LEVEL |
| --- | --- | --- |
| Livingroom | 6:00 am-11:59 am | 55 dB |
| Livingroom | 12:00 pm-7:59 pm | 65 dB |
| Livingroom | 8:00 pm-5:59 am | 45 dB |
| Bedroom | 6:00 am-11:59 am | 60 dB |
| Bedroom | 12:00 pm-7:59 pm | 60 dB |
| Bedroom | 8:00 pm-5:59 am | 40 dB |

The spillover manager 102 of the illustrated example finds an expected sound pressure level for a meter identified by the meter identifier at a time identified by the timestamp. For example, the spillover manager 102 may identify a particular expected sound pressure level representative of a media presentation being presented in a bedroom (e.g., the room 110) at 11:00 pm (e.g., 40 dB).

To determine if spillover occurred, the spillover manager 102 of the illustrated example compares the expected sound pressure level for the identified meter and/or time to the actual sound pressure level collected and/or determined by the example first and/or second media identifying meter 106, 112 that collected the media identification data being analyzed. If the actual sound pressure level is sufficiently similar to the expected sound pressure level (e.g., within a threshold amount) to conclude that the media in question originated in the same room as the media identifying meter that detected it, the example spillover manager 102 determines that spillover did not occur for the corresponding media identification event. Thus, the person(s) (e.g., the panelist 118) identified as present by a first people meter 128 associated with the corresponding media identifying meter that collected the data (e.g., the first media identifying meter 106/first media presentation device 108 or a second people meter 130 associated with the second media identifying meter 112/second media presentation device 114) are credited as having been exposed to the media. If the actual sound pressure level is not sufficiently similar to the expected sound pressure level (e.g., within a threshold amount) to conclude that the corresponding media originated from a media presentation device intended to be monitored by the media identifying meter in question, the example spillover manager 102 determines that spillover occurred for the corresponding media identification event. Thus, the persons (e.g., the panelist 118) identified as present by the corresponding people meter (e.g., the first people meter 128 or the second people meter 130) are not credited as having been exposed to the media. In other words, when the example spillover manager 102 of FIG. 1 determines that spillover has occurred, the media is not credited with an actual media exposure at the corresponding media presentation device (e.g., media presentation devices 108, 114).

For example, when the first example media identifying meter 106 receives a media signal, it determines an actual sound pressure level for the received media signal, in addition to collecting media monitoring data for the received media signal. In such an example, the first media identifying meter 106 timestamps the actual sound pressure level data. It then sends the actual sound pressure level data and the media monitoring data along with a meter identifier of the first example media identifying meter 106 to the example spillover manager 102. The example spillover manager 102 of FIG. 1 identifies the media identifying meter 106 from the meter identifier, identifies a time from the timestamp, and accesses (e.g., looks up in a local database or cache, retrieves from a remote database such as a database at the central facility 120) an expected sound pressure level associated with or dependent on the media identifying meter 106 and/or the time. If the actual sound pressure level is sufficiently similar to the expected sound pressure level, the example spillover manager 102 of FIG. 1 assumes the media was presented on the first example media presentation device 108 corresponding to the first media identifying meter 106 (i.e., the media identifying meter that provided the media monitoring data under analysis) and credits the media as an actual media exposure at the corresponding media presentation device. Thus, the person(s) identified as present by the first people meter 128 (e.g., the panelist 118) are credited as having been exposed to the media. If the actual sound pressure level is not sufficiently similar to the expected sound pressure level, the example spillover manager 102 assumes the media was not presented on the example media presentation device 108 (e.g., the media was presented on the media presentation device 114 and the media signal spilled over to the example media identifying meter 106), and does not credit the media as an actual media exposure (e.g., does not credit the media with exposure to the panelist 118).

While the spillover manager 102 of the illustrated example is shown within the example home processing system 104, the spillover manager 102 may be implemented at the first media identifying meter 106, the second media identifying meter 112, and/or at the central facility 120.

Figure 2:
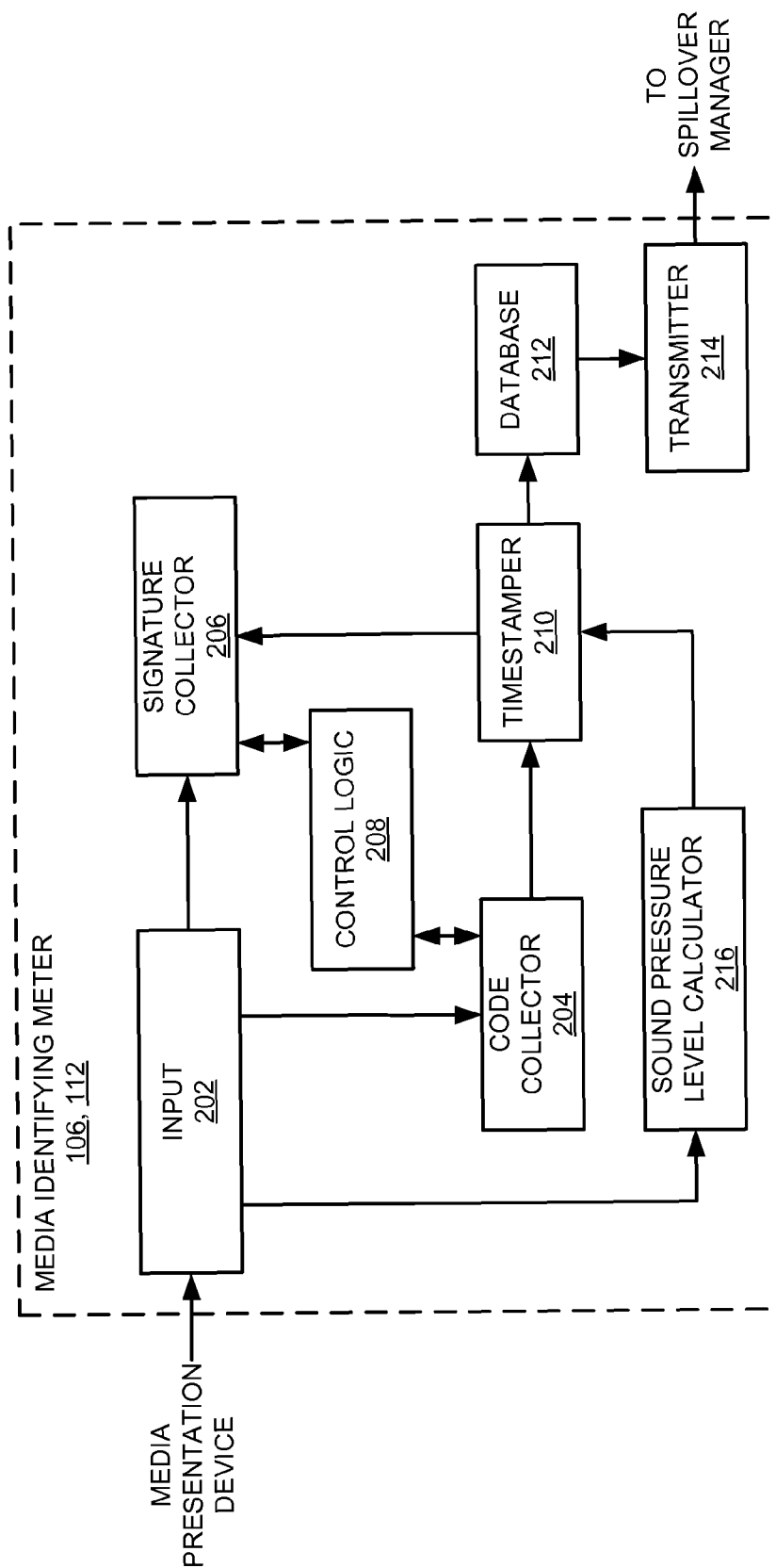
FIG. 2 illustrates an example implementation of an example media identifying meter of FIG. 1.

FIG. 2 is a block diagram of an example implementation of the first and/or second media identifying meters 106, 112 of FIG. 1. The media identifying meter 106, 112 of the illustrated example receives media signals (e.g., audio signals) from one or more media presentation devices (e.g., the first or second media presentation device 108, 114 of FIG. 1). In the illustrated example, the media identifying meter 106, 112 is used to collect media monitoring data (e.g., to extract and/or analyze codes and/or signatures from media signals output by a corresponding media presentation device 108, 114). The media identifying meter 106, 112 also detects sound pressure levels of the media signals. Thus, the media identifying meter 106, 112 of the illustrated example is used to collect, aggregate, locally process, and/or transfer media monitoring data and/or sound pressure level data to the spillover manager 102 of FIG. 1. The media identifying meter 106, 112 of the illustrated example includes an example input 202, an example code collector 204, an example signature generator 206, example control logic 208, an example timestamper 210, an example database 212, an example transmitter 214, and an example sound pressure level calculator 216.

In the illustrated example, the input 202 is a microphone exposed to ambient sound and serves to collect audio signals output by monitored media presentation devices (e.g., the media presentation device 108). To collect media monitoring data associated with the audio signals, the input 202 of the illustrated example passes a received audio signal to the code collector 204 and/or the signature generator 206. The code collector 204 of the illustrated example extracts codes and/or the signature generator 206 generates signatures from the signal to identify broadcasters, channels, stations, and/or programs. The control logic 208 of the illustrated example is used to control the code collector 204 and/or the signature generator 206 to cause collection of a code, a signature, or both a code and a signature. The identified codes and/or signatures (e.g., the media monitoring data) are timestamped at the example timestamper 210, are stored in the example database 212, and are transmitted by the example transmitter 214 to the spillover manager 102 at the home processing system 104. Although the example of FIG. 2 collects codes and/or signatures from audio signals, codes or signatures can additionally or alternatively be collected from other portion(s) of the signal (e.g., from the video portion).

The input 202 of the illustrated example also passes the received audio signal to the example sound pressure level calculator 216. The sound pressure level calculator 216 of the illustrated example calculates a sound pressure level of the received audio signal by taking a logarithmic measure of a measured root mean square (RMS) sound pressure of the audio signal relative to a reference sound pressure. In some examples, the reference sound pressure is 20 micro-Pascals RMS (μPa RMS), which is considered a threshold of human hearing. An example sound pressure level for a media presentation is 60 decibels (dB). An example equation to calculate a sound pressure level ($L_p$) is illustrated below.

$$L_p = 20\ \log_{10}\!\left(\frac{p_{rms}}{p_{ref}}\right) dB$$

The sound pressure level calculated by the example sound pressure level calculator 216 is referred to as the actual sound pressure level. The actual sound pressure level is timestamped by the example timestamper 210. The timestamped actual sound pressure level is stored at the example database 212 in association with a meter identifier to identify the media identifying meter 106, 112 that detected the sound pressure level. The meter identifier identifies the particular media identifying meter (e.g., the media identifying meter 106 or the media identifying meter 112) collecting the media monitoring data and calculating the actual sound pressure level data. The meter identifier may be an identification code (e.g., a series of letters and/or numbers) that may be used to identify the media identifying meter 106 or the media identifying meter 112. The timestamped actual sound pressure level data (in association with the meter identifier) is transmitted by the example transmitter 214 to the example spillover manager 102 with the media monitoring data.

While an example manner of implementing the media identifying meter 106, 112 of FIG. 1 is illustrated in FIG. 2, one or more of the elements, processes and/or devices illustrated in FIG. 2 may be combined, divided, re-arranged, omitted, eliminated and/or implemented in any other way. Further, the example input 202, the example code collector 204, the example signature collector 206, the example control logic 208, the example timestamper 210, the example database 212, the example transmitter 214, the example sound pressure level calculator 216, and/or, more generally, the example media identifying meter 106, 112 of FIG. 1 may be implemented by hardware, software, firmware and/or any combination of hardware, software and/or firmware. Thus, for example, any of the example input 202, the example code collector 204, the example signature collector 206, the example control logic 208, the example timestamper 210, the example database 212, the example transmitter 214, the example sound pressure level calculator 216, and/or, more generally, the example media identifying meter 106, 112 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example input 202, the example code collector 204, the example signature collector 206, the example control logic 208, the example timestamper 210, the example database 212, the example transmitter 214, the example sound pressure level calculator 216, and/or the example media identifying meter 106, 112 are hereby expressly defined to include a tangible computer readable storage device or storage disc such as a memory, DVD, CD, Blu-ray, etc. storing the software and/or firmware. Further still, the example media identifying meter 106, 112 of FIG. 1 may include one or more elements, processes and/or devices in addition to, or instead of, those illustrated in FIG. 2, and/or may include more than one of any or all of the illustrated elements, processes and devices.

Figure 3:
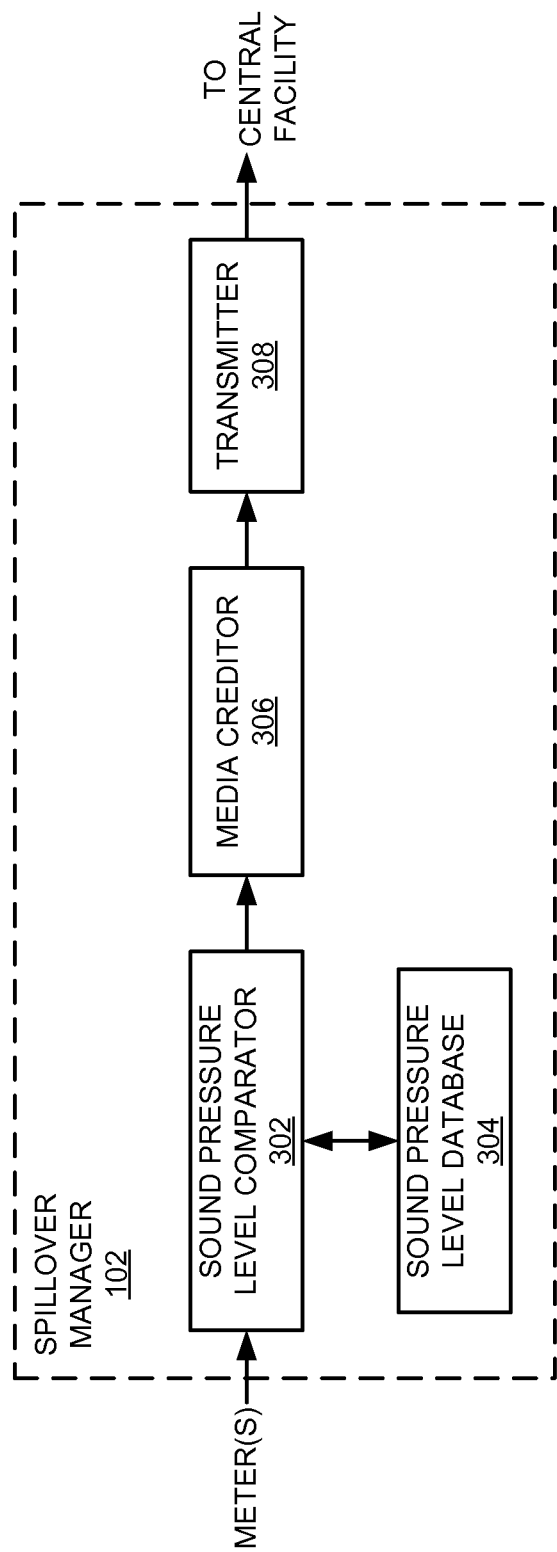
FIG. 3 illustrates an example implementation of the example spillover manager of FIG. 1.

FIG. 3 is a block diagram of an example implementation of the example spillover manager 102 of FIG. 1. The spillover manager 102 of the illustrated example receives media monitoring data and actual sound pressure level data from one or more media identifying meter(s) (e.g., the media identifying meters 106, 112 of FIG. 1). In the illustrated example, the spillover manager 102 uses the media monitoring data and the actual sound pressure level data to determine whether spillover occurred and, based on that spillover determination, whether identified media programs are to be credited with actual exposure to a panelist. The spillover manager 102 of the illustrated example is used to transfer credited media monitoring data (e.g., media monitoring data associated with credited media programs) to the central facility 120 of FIG. 1. The spillover manager 102 of the illustrated example includes an example sound pressure level comparator 302, an example sound pressure level database 304, an example media creditor 306, and an example transmitter 308.

The sound pressure level comparator 302 of the illustrated example receives media monitoring data and actual sound pressure levels from the media identifying meter(s) (e.g., the first and second media identifying meters 106, 112 of FIG. 1). The sound pressure level comparator 302 of the illustrated example identifies expected sound pressure level data to be compared with the actual sound pressure level data. To identify the relevant expected sound pressure level data stored in the example sound pressure level database 304, the sound pressure level comparator 302 of the illustrated example uses the meter identifier and/or the timestamp associated with the actual sound pressure levels.

For each media identifying meter in a home (e.g., the first and second media identifying meters 106, 112), the example sound pressure level database 304 stores one or more expected sound pressure levels based on days and/or times of media presentations being monitored by the media identifying meters. For example, for each particular media identifying meter, the example sound pressure level database 304 stores an expected sound pressure level for particular day(s) and/or time(s). Expected sound pressure levels may be calculated and/or determined by the example spillover manager 102 at the example spillover manager 102 to monitor the example system 100 of FIG. 1 and/or the expected sound pressure levels may be calculated at, for example, a central facility (e.g., the central facility 120 of FIG. 1). In some examples, the spillover manager 102 may be implemented at the central facility 120 to process data collected from various meters. Additionally or alternatively, the sound pressure level database 304 may be located at the central facility and the spillover manager 102 may query the database 304 via the network 122.

The sound pressure level comparator 302 of the illustrated example finds an expected sound pressure level in the example sound pressure level database 304 corresponding to an actual sound pressure level by identifying a media identifying meter using the meter identifier and by identifying a time of presentation of a media presentation using the timestamp (e.g., using a table such as Table 1 above). Once the sound pressure level comparator 302 obtains the expected sound pressure level associated with the media identifying meter and/or time of presentation, the sound pressure level comparator 302 of the illustrated example compares the expected sound pressure level to the actual sound pressure level.

If the actual sound pressure level is sufficiently similar to the expected sound pressure level (e.g., if a difference between the actual sound pressure level and the expected sound pressure level is within a threshold amount), the sound pressure level comparator 302 of the illustrated example determines spillover did not occur and instructs the example media creditor 306 to credit the media as an actual media exposure. If the actual sound pressure level is not sufficiently similar to the expected sound pressure level (e.g., if the difference between the actual sound pressure level (such as 55 dB) and the expected sound pressure level (such as 60 dB) is not within the threshold amount (such as 2 dB)), the sound pressure level comparator 302 of the illustrated example determines that spillover did occur and instructs the example media creditor 306 to not credit the media as an actual media exposure.

The media creditor 306 of the illustrated example credits/does not credit media as actual media exposure based on the output of the example sound pressure level comparator 302. If the example sound pressure level comparator 302 determines that spillover did not occur, the media creditor 306 of the illustrated example marks the media monitoring data associated with the media as credited. If the example sound pressure level comparator 302 determines that spillover did occur, the media creditor 306 of the illustrated example discards the media monitoring data associated with the media. In some examples, rather than discarding the media monitoring data associated with the media that is not credited, the example media creditor 306 marks the media monitoring data associated with the media as uncredited.

The transmitter 308 of the illustrated example transmits the credited media monitoring data to a central facility (e.g., the central facility 120 of FIG. 1) for further processing. In some examples, where the example media creditor 306 does not discard the uncredited media monitoring data, the example transmitter 308 transmits the credited media monitoring data and the uncredited media monitoring data to the central facility 120 for further processing.

While an example manner of implementing the spillover manager 102 of FIG. 1 is illustrated in FIG. 3, one or more of the elements, processes and/or devices illustrated in FIG. 3 may be combined, divided, re-arranged, omitted, eliminated and/or implemented in any other way. Further, the example sound pressure level comparator 302, the example sound pressure level database 304, the example media creditor 306, the example transmitter 308, and/or, more generally, the example spillover manager 102 of FIG. 1 may be implemented by hardware, software, firmware and/or any combination of hardware, software and/or firmware. Thus, for example, any of the example sound pressure level comparator 302, the example sound pressure level database 304, the example media creditor 306, the example transmitter 308, and/or, more generally, the example spillover manager 102 could be implemented by one or more circuit(s), programmable processor(s), application specific integrated circuit(s) (ASIC(s)), programmable logic device(s) (PLD(s)) and/or field programmable logic device(s) (FPLD(s)), etc. When reading any of the apparatus or system claims of this patent to cover a purely software and/or firmware implementation, at least one of the example sound pressure level comparator 302, the example sound pressure level database 304, the example media creditor 306, the example transmitter 308, and/or the example spillover manager 102 are hereby expressly defined to include a tangible computer readable storage device or storage disc such as a memory, DVD, CD, Blu-ray, etc. storing the software and/or firmware. Further still, the example spillover manager 102 of FIG. 1 may include one or more elements, processes and/or devices in addition to, or instead of, those illustrated in FIG. 3, and/or may include more than one of any or all of the illustrated elements, processes and devices.

Figure 4:
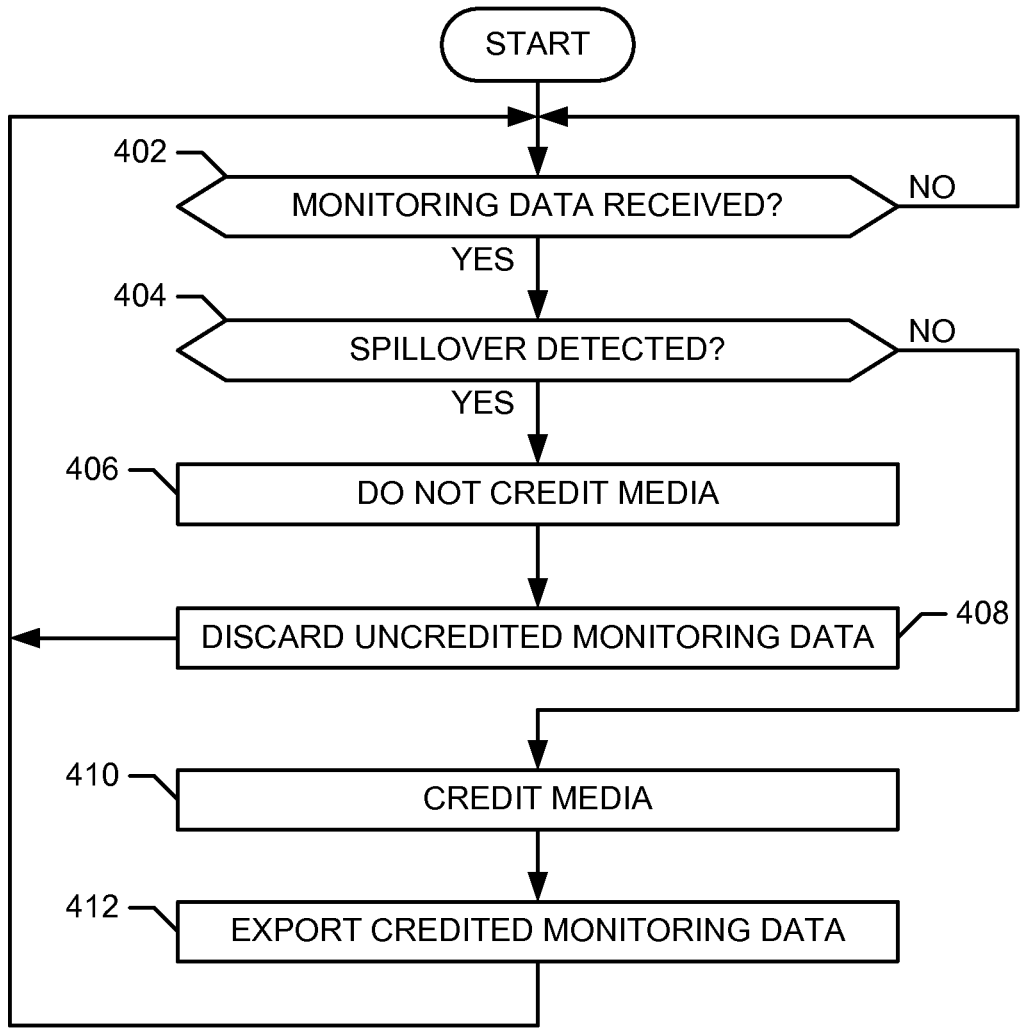
FIG. 4 is a flow diagram representative of example machine readable instructions that may be executed to implement the example spillover manager of FIGS. 1 and/or 3.
Figure 5:
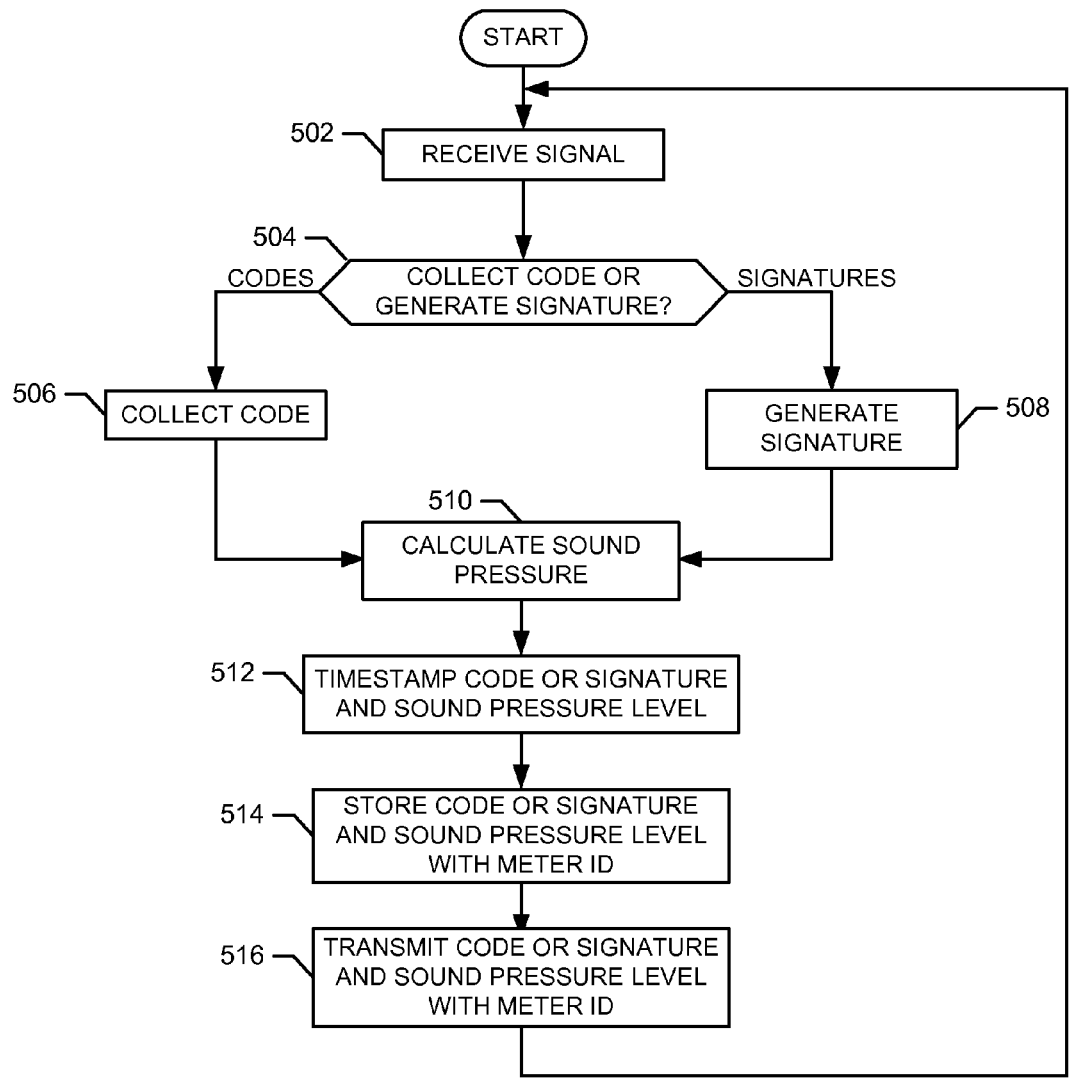
FIG. 5 is a flow diagram representative of example machine readable instructions that may be executed to implement the example media identifying meter of FIGS. 1 and/or 2.
Figure 6:
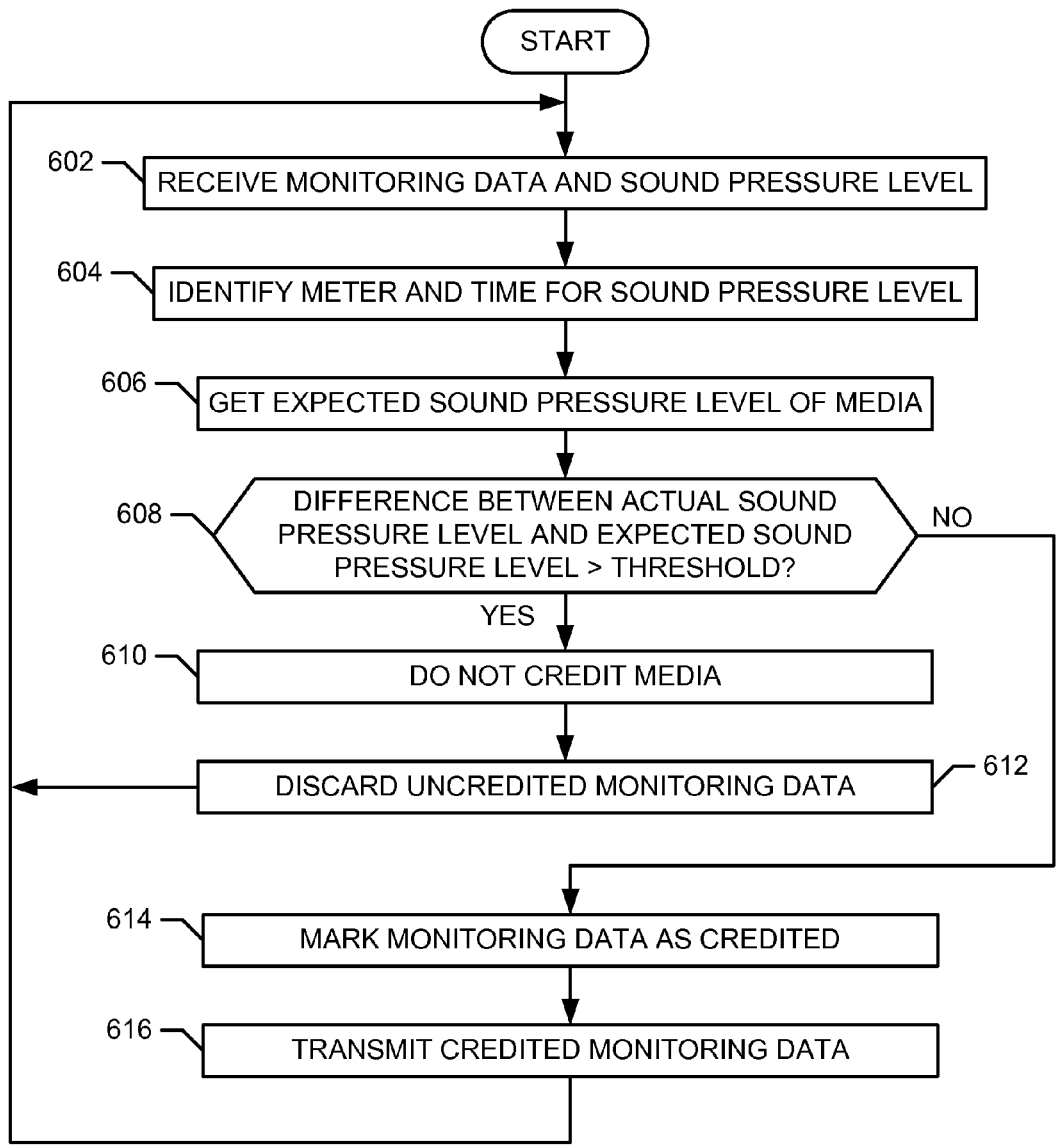
FIG. 6 is another flow diagram representative of example machine readable instructions that may be executed to implement the example spillover manager of FIGS. 1 and/or 3.

Flowcharts representative of example machine readable instructions for implementing the media identifying meter 106, 112 of FIGS. 1 and 2 and the spillover manager 102 of FIGS. 1 and 3 are shown in FIGS. 4, 5, and 6. In this example, the machine readable instructions comprise a program for execution by a processor such as the processor 712 shown in the example processor platform 700 discussed below in connection with FIG. 7. The program may be embodied in software stored on a tangible computer readable storage medium such as a CD-ROM, a floppy disk, a hard drive, a digital versatile disk (DVD), a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 4, 5, and 6, many other methods of implementing the example media identifying meter 106, 112 and the example spillover manager 102 may alternatively be used. For example, the order of execution of the blocks may be changed, and/or some of the blocks described may be changed, eliminated, or combined.

As mentioned above, the example processes of FIGS. 4, 5, and 6 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIGS. 4, 5, and 6 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disc and to exclude propagating signals. As used herein, when the phrase "at least" is used as the transition term in a preamble of a claim, it is open-ended in the same manner as the term "comprising" is open ended.

FIG. 4 is a flow diagram representative of example machine readable instructions that may be executed to implement the example spillover manager 102 of FIG. 1 to manage audio spillover in the example system 100 of FIG. 1. The spillover manager 102 of the illustrated example is used to manage spillover to reduce (e.g., prevent) media monitoring inaccuracies in the system 100.

The example spillover manager 102 determines if media monitoring data has been received (block 402). The example spillover manager 102 is to receive media monitoring data from one or more media identifying meter(s) (e.g., the first and/or second media identifying meters 106, 112 of FIG. 1). The media monitoring data is representative of media that has been presented on one or more media presentation device(s) (e.g., the first and/or second media presentation devices 108, 114 of FIG. 1). Control remains at block 402 until media monitoring data is received by the example spillover manager 102).

The example spillover manager 102 of the illustrated example analyzes the media monitoring data to determine if spillover has occurred (block 404). An example method to determine if spillover has occurred is described below with reference to FIG. 6. If the example spillover manager 102 detects spillover associated with the first and/or second media identifying meters 106, 112 based on the media monitoring data, the media identified in the media monitoring data is not credited as an actual media exposure (block 406) and the media monitoring data associated with the uncredited media is discarded (block 408). Control then returns to block 402. In some examples, rather than discarding the uncredited media monitoring data, the example spillover manager 102 identifies the media monitoring data as uncredited media and exports the uncredited media monitoring data to a central facility (e.g., the example central facility 120).

If the example spillover manager 102 of the illustrated example does not detect spillover associated with the first and/or the second media identifying meter 106, 112, the media identified in the media monitoring data is credited as an actual media exposure (block 410). The example spillover manager 102 of the illustrated example exports media monitoring data associated with credited media to the example central facility 120 (block 412). Control then returns to block 402 when the instructions are complete.

FIG. 5 is a flow diagram representative of example machine readable instructions that may be executed to implement the example media identifying meter 106, 112 of FIG. 1 to collect media monitoring data and to calculate sound pressure levels. In the illustrated example, to collect media monitoring data, the media identifying meter 106, 112 extracts and/or analyzes codes and/or signatures from data and/or signals received from one or more media presentation devices (e.g., the first and/or the second media presentation devices 108, 114 of FIG. 1).

Initially, the example input 202 obtains a signal (e.g., an audio signal) from the one or more media presentation devices (e.g., the first and/or the second media presentation devices 108, 114) (block 502). The example control logic 208 determines whether to collect a code or generate a signature from the signal obtained at the input 202 (block 504). In the illustrated example, either a code is collected or a signature is generated from the signal. In other examples, both a code and a signature are collected and/or generated.

If a code is to be collected, the example code collector 204 collects a code from the signal obtained at the input 202 (block 506). The example code collector 204 passes the collected code(s) to the timestamper 210. If a signature is to be generated, the signature generator 206 generates a signature from the signal obtained at the input 202 (block 508). The example signature generator 206 passes the generated signature(s) to the timestamper 210.

The example sound pressure level calculator 216 of the illustrated example calculates a sound pressure level of the signal obtained at the input 202 (block 510). The example sound pressure level calculator 216 passes data representative of the actual sound pressure level to the example timestamper 210. The example timestamper 210 timestamps the collected codes and/or generated signatures and the actual sound pressure level (block 512). The example timestamper 210 passes the collected codes and/or generated signatures and the actual sound pressure level to the example database 212. The example database 212 stores the collected codes and/or generated signatures and the actual sound pressure level along with an identifier of the media identifying meter (e.g., the media identifying meter 106, 112 of FIG. 1) (block 514). The example transmitter 214 periodically and/or aperiodically transmits the collected codes and/or generated signatures and the actual sound pressure level data along with the meter identifier to the spillover manager 102 of FIG. 1 (block 516). Control then returns to block 502. In some examples, the media identifying meter 106, 112 collects and timestamps samples of the audio, and periodically or aperiodically exports the timestamped data for analysis by the spillover manager 102 (which may be located at the panelist site or at the central facility). In such examples, blocks 504-510 and 514 are not performed in the media identifying meter 106, 112, and blocks 512 and 516 are modified to operate on the received signal (as opposed to on codes, signatures, and/or sound pressure levels).

FIG. 6 is a flow diagram representative of example machine readable instructions that may be executed to implement the example spillover manager 102 of FIG. 3 to manage audio spillover in the example system 100 of FIG. 1 using sound pressure levels. The spillover manager 102 of the illustrated example is used to manage spillover to reduce media monitoring inaccuracies in the system 100.

The example spillover manager 102 receives media monitoring data and actual sound pressure levels from one or more media identifying meter(s) (e.g., the first and/or second media identifying meters 106, 112 of FIG. 1) (block 602). The example spillover manager 102 uses the media monitoring data and the actual sound pressure level data to determine whether spillover occurred (e.g., in the example system 100 of FIG. 1) and whether media is to be credited with an actual media exposure event.

The example sound pressure level comparator 302 identifies a media identifying meter associated with the actual sound pressure level (e.g., using the meter identifier included with the actual sound pressure level) and/or a time associated with the actual sound pressure level (e.g., using the timestamp of the actual sound pressure level data) (block 604). Based on the meter identifier and/or the timestamp, the example sound pressure level comparator 302 uses the example sound pressure level database 304 to identify an expected sound pressure level associated with the meter and the time at which the actual sound pressure level data was collected (block 606). For each media identifying meter in a home (e.g., the first and second media identifying meters 106, 112), the example sound pressure level database 304 stores one or more expected sound pressure levels based on days and/or times of media presentations being monitored by the corresponding media identifying meters (see, for example, Table 1 above). The sound pressure level comparator 302 of the illustrated example finds an expected sound pressure level in the example sound pressure level database 304 corresponding to the actual sound pressure level by identifying a media identifying meter using the meter identifier and by identifying a time of presentation of the corresponding media presentation using the timestamp.

The example sound pressure level comparator 302 compares a difference between the expected sound pressure level and the actual sound pressure level (e.g., the actual sound pressure level received from the first and/or the second media identifying meter 106, 112) to a threshold (block 608). If the difference between the actual sound pressure level and the expected sound pressure level is not within the threshold amount (e.g., is greater than the threshold), the example sound pressure level comparator 302 determines that spillover did occur and instructs the example media creditor 306 not to credit the media as an actual media exposure (block 610). If the example sound pressure level comparator 302 determines that spillover did occur, the example media creditor 306 discards the media monitoring data associated with the media (block 612). Control then returns to block 602. In some examples, rather than discarding the media monitoring data associated with the media that is not credited, the example media creditor 306 marks the media monitoring data associated with the media as uncredited.

If the difference between the actual sound pressure level and the expected sound pressure level is within a threshold amount (e.g., less than the threshold) (block 608), the example sound pressure level comparator 302 determines spillover did not occur and the example media creditor 306 credits the media as an actual media exposure (block 614). In particular, the example media creditor 306 marks the media monitoring data associated with the media as credited (block 614). The example transmitter 308 transmits the credited media monitoring data to a central facility (e.g., the central facility 120 of FIG. 1) for further processing (block 616). In some examples, where the example media creditor 306 does not discard the uncredited media monitoring data, the example transmitter 308 transmits the credited media monitoring data and the uncredited media monitoring data to the central facility 120 for further processing (block 616). Control then returns to block 602 when the instructions are complete.

The credited media monitoring data is combined with the people meter data using timestamps to align the two data sources to match demographics and audience size data to the credited media exposures.

Figure 7:
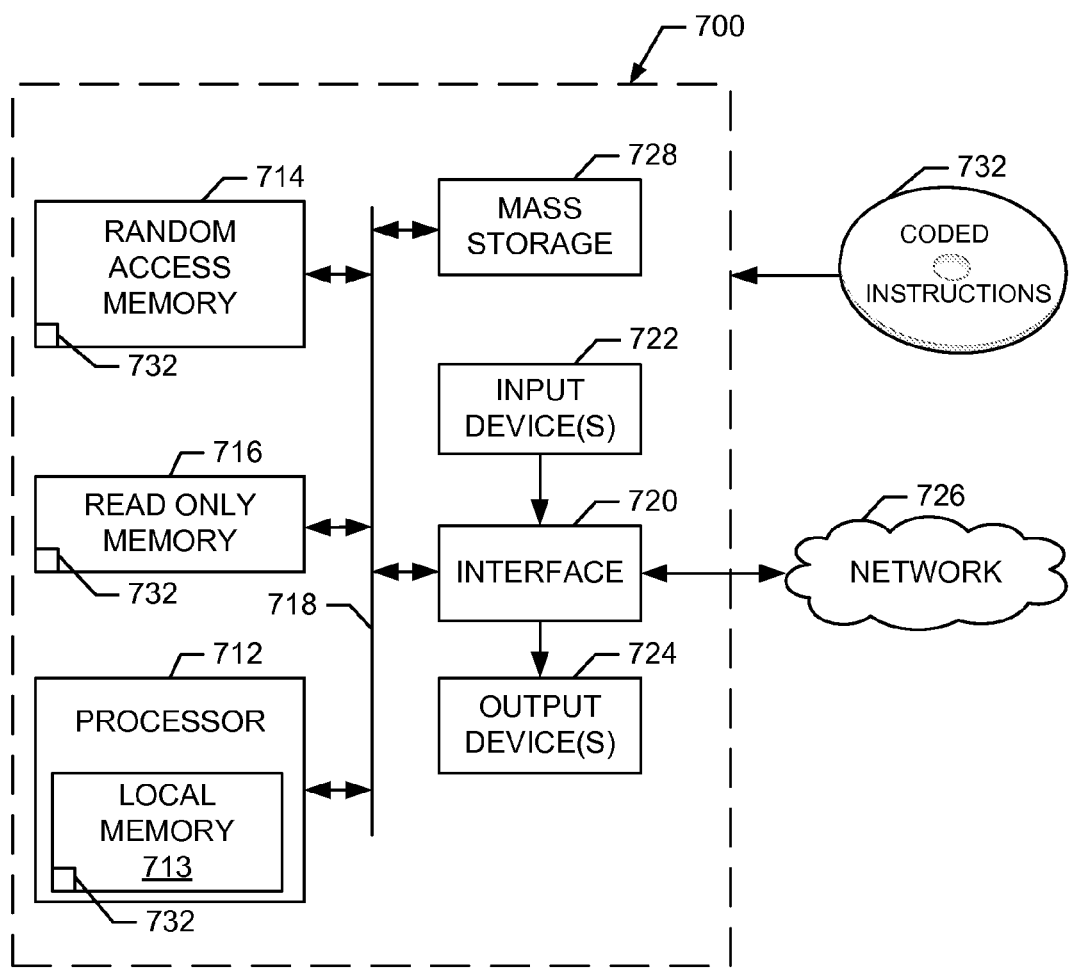
FIG. 7 is a block diagram of an example processor platform that may be used to execute the instructions of FIGS. 4, 5, and/or 6 to implement the example media identifying meter 106 of FIG. 2, the example spillover manager of FIG. 3, and/or, more generally, the example system of FIG. 1.

FIG. 7 is a block diagram of an example processor platform 700 capable of executing the instructions of FIGS. 4, 5, and 6 to implement the media identifying meter 106, 112 of FIGS. 1 and 2 and the spillover manager 102 of FIGS. 1 and 3. The processor platform 700 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 700 of the illustrated example includes a processor 712. The processor 712 of the illustrated example is hardware. For example, the processor 712 can be implemented by one or more integrated circuits, logic circuits, microprocessors or controllers from any desired family or manufacturer.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), and/or a PCI express interface.

In the illustrated example, one or more input devices 722 are connected to the interface circuit 720. The input device(s) 722 permit a user to enter data and commands into the processor 712. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 720 of the illustrated example, thus, typically includes a graphics driver card.

The interface circuit 720 of the illustrated example also includes a communication device such as a transmitter, a receiver, a transceiver, a modem and/or network interface card to facilitate exchange of data with external machines (e.g., computing devices of any kind) via a network 726 (e.g., an Ethernet connection, a digital subscriber line (DSL), a telephone line, coaxial cable, a cellular telephone system, etc.).

The processor platform 700 of the illustrated example also includes one or more mass storage devices 728 for storing software and/or data. Examples of such mass storage devices 728 include floppy disk drives, hard drive disks, compact disk drives, Blu-ray disk drives, RAID systems, and digital versatile disk (DVD) drives.

The coded instructions 732 of FIGS. 4, 5, and 6 may be stored in the mass storage device 728, in the volatile memory 714, in the non-volatile memory 716, and/or on a removable tangible computer readable storage medium such as a CD or DVD.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method to reduce spillover in a media measuring system, comprising:
   identifying media associated with media monitoring data, the media monitoring data being received from a first meter associated with a first media presentation device;
   identifying an expected sound pressure level associated with the first meter;
   comparing, with a processor, the expected sound pressure level to an actual sound pressure level collected from the media by the first meter to determine if spillover occurred; and
   crediting, with the processor, the media as a media exposure if the spillover did not occur.

2. The method of claim 1, wherein a value of the expected sound pressure level depends on a time the media was presented at the first media presentation device.

3. The method of claim 1, wherein the actual sound pressure level is calculated by taking a logarithmic measure of a root mean square sound pressure of an audio signal associated with the media relative to a reference sound pressure.

4. The method of claim 1, wherein the comparing of the expected sound pressure level to the actual sound pressure level includes comparing a difference between the expected sound pressure level and the actual sound pressure level to a threshold.

5. The method of claim 1, wherein the crediting of the media as the media exposure includes marking the media monitoring data as credited.

6. The method of claim 5, further including transmitting the marked media monitoring data to a central facility.

7. The method of claim 1, further including not crediting the media as a media exposure if the spillover did occur.

8. The method of claim 1, further including, if the spillover did occur, discarding the media monitoring data associated with the spillover.

9. The method of claim 1, further including, if the spillover did occur, marking the media monitoring data associated with the spillover as not credited.

10. A spillover manager to reduce spillover in a media measuring system, comprising:
    a sound pressure level comparator including a logic circuit to:
       compare an expected sound pressure level for media associated with media monitoring data received from a meter associated with a media presentation device to an actual sound pressure level to determine if spillover occurred, the actual sound pressure level based on the media detected by the meter; and
    a media creditor to:
       credit the media with an exposure if the spillover did not occur; and not credit the media with the exposure if the spillover did occur.

11. The spillover manager of claim 10, wherein the expected sound pressure level depends on a time the media was presented at the first media presentation device.

12. The spillover manager of claim 10, wherein the meter is to calculate the actual sound pressure level by taking a logarithmic measure of a root mean square sound pressure of an audio signal associated with the media relative to a reference sound pressure.

13. The spillover manager of claim 10, wherein the sound pressure level comparator is to compare the expected sound pressure level to the actual sound pressure level by comparing a difference between the expected sound pressure level and the actual sound pressure level to a threshold.

14. The spillover manager of claim 10, wherein to credit the media with the exposure, the media creditor is to mark the media monitoring data as credited.

15. The spillover manager of claim 10, wherein the media creditor is to discard the media monitoring data if the spillover did occur.

16. The spillover manager of claim 10, wherein the media creditor is to mark the media monitoring data as not credited if the spillover did occur.

17. A spillover manager to reduce spillover in a media measuring system, comprising:
a sound pressure level comparator to:
compare an expected sound pressure level for media associated with media monitoring data received from a meter associated with a media presentation device to an actual sound pressure level to determine if spillover occurred, the actual sound pressure level based on the media detected by the meter;
a media creditor to:
credit the media with an exposure if the spillover did not occur; and
not credit the media with the exposure if the spillover did occur; and
a transmitter to transmit the credited media monitoring data to a central facility.

18. A tangible computer readable storage medium comprising instructions that, when executed, cause a processor to at least:
identify media associated with media monitoring data, the media monitoring data being received from a first meter associated with a first media presentation device;
identify an expected sound pressure level associated with the first meter;
compare the expected sound pressure level to an actual sound pressure level collected from the media by the first meter to determine if the spillover occurred; and
credit the media as a media exposure if the spillover did not occur.

19. The computer readable medium of claim 18, wherein a value of the expected sound pressure level depends on a time the media was presented at the first media presentation device.

20. The computer readable medium of claim 18, wherein the actual sound pressure level is calculated by taking a logarithmic measure of a root mean square sound pressure of an audio signal associated with the media relative to a reference sound pressure.

21. The computer readable medium of claim 18, wherein the comparing of the expected sound pressure level to the actual sound pressure level includes comparing a difference between the expected sound pressure level and the actual sound pressure level to a threshold.

22. The computer readable medium of claim 18, wherein the crediting of the media as the media exposure includes marking the media monitoring data as credited.

23. The computer readable medium of claim 22, further including instructions that cause the processor to transmit the marked media monitoring data to a central facility.

24. The computer readable medium of claim 18, further including instructions that cause the processor to not credit the media as a media exposure if the spillover did occur.

25. The computer readable medium of claim 18, further including instructions that cause the processor to discard the media monitoring data if the spillover did occur.

26. The computer readable medium of claim 18, further including instructions that cause the processor to mark the media monitoring data as not credited if the spillover did occur.

* * * * *